(12) United States Patent
Tsutsumikoshi et al.

(10) Patent No.: US 8,074,764 B2
(45) Date of Patent: Dec. 13, 2011

(54) STRADDLE TYPE VEHICLE WITH ELECTRIC POWER STEERING APPARATUS

(75) Inventors: Shinobu Tsutsumikoshi, Hamamatsu (JP); Tetsuya Banjo, Hamamatsu (JP)

(73) Assignee: Suzuki Kabushiki Kaisha, Hamamatsu-shi, Shizuoka-ken (JP)

( * ) Notice: Subject to any disclaimer, the term of this patent is extended or adjusted under 35 U.S.C. 154(b) by 286 days.

(21) Appl. No.: 12/234,073

(22) Filed: Sep. 19, 2008

(65) Prior Publication Data
US 2009/0078492 A1 Mar. 26, 2009

(30) Foreign Application Priority Data
Sep. 21, 2007 (JP) .................................. 2007-245775

(51) Int. Cl.
*B62D 5/04* (2006.01)
(52) U.S. Cl. ........................................ 180/443; 180/444
(58) Field of Classification Search .................. 180/443, 180/444
See application file for complete search history.

(56) References Cited

U.S. PATENT DOCUMENTS

| | | | | |
|---|---|---|---|---|
| 2006/0065472 A1* | 3/2006 | Ogawa et al. | | 180/444 |
| 2006/0191737 A1* | 8/2006 | Kobayashi | | 180/444 |
| 2006/0219469 A1* | 10/2006 | Okada et al. | | 180/443 |
| 2008/0053743 A1* | 3/2008 | Tomita | | 180/443 |

FOREIGN PATENT DOCUMENTS

| | | |
|---|---|---|
| JP | 2004-231011 | 8/2004 |
| JP | 2006-224713 | 8/2006 |

* cited by examiner

*Primary Examiner* — Tony H. Winner
*Assistant Examiner* — Jacob Knutson
(74) *Attorney, Agent, or Firm* — Barnes & Thornburg LLP

(57) ABSTRACT

A straddle type vehicle is provided with a body frame of a vehicle, a bar handle provided in a front portion of the vehicle body frame, a steering shaft transmitting a turning operation of the bar handle to a pair of right and left front wheels, and an electric power steering apparatus mounted in an intermediate portion of the steering shaft for assisting a steering motion of the bar handle. The electric power steering apparatus includes, in a state of the vehicle capable of being traveled, an electric power steering main body including an electric motor, a gear unit, an input shaft and an output shaft, an upper steering shaft in which the bar handle is attached to an upper end portion and an upper end of the input shaft is connected to a lower end portion, and a support member supporting the upper steering shaft.

4 Claims, 7 Drawing Sheets

STRADDLE TYPE VEHICLE WITH ELECTRIC POWER STEERING APPARATUS

CROSS-REFERENCE TO RELATED APPLICATIONS

This application is a U.S. Non-Provisional Utility Patent Application based upon and claiming the benefit of priority to Japanese Patent Application No. JP 245775/2007, filed on Sep. 21, 2007, the contents of which are incorporated herein by reference.

BACKGROUND OF THE INVENTION

1. Field of the Invention

This invention relates to a straddle type vehicle particularly provided with an electric power steering apparatus.

2. Related Art

A straddle type vehicle such as an all terrain vehicle or the like includes an electric power steering apparatus for the purpose of reducing an operating force of a bar handle. The power steering apparatus applies an auxiliary rotating force to a steering shaft by an electric motor. As an arrangement of the electric motor, for example, an electric motor is arranged so as to be directed perpendicularly to an axis of a steering shaft and to cross an upper side of a front suspension support portion extending in a longitudinal direction of the vehicle toward the outside of a vehicle width direction (refer, for example, to Patent Document 1: Japanese Patent Application Laid-Open Publication No. 2004-231011), or an electric motor is arranged in the vicinity of a bearing portion in a lower portion of a steering shaft (refer, for example, to Patent Document 2: Japanese Patent Application Laid-Open Publication No. 2006-224713).

However, since the power steering apparatus is arranged in the lower portion of the vehicle body in these conventional structures, the electric motor is strongly affected by muddy water and a dust splashed by front wheels of a vehicle. The electric motor tends to be affected by heat from the engine. Further, assembling workability is not good, and maintenance thereof is not easy. A foreign material such as the muddy water, the dust or the like and the heat deteriorates a durability of the power steering apparatus constructed by an electronic device such as the electric motor, a controller and the like.

On the other hand, if the electric motor of the power steering apparatus is arranged so as to cross an upper side of the front suspension support portion toward the outside of the vehicle width direction, a freedom of an actuation of a suspension apparatus will be limited, and the assembling workability is not good with poor maintenance ability.

SUMMARY OF THE INVENTION

The present invention is made by taking the circumstances mentioned above into consideration, and an object of the present invention is to provide a straddle type vehicle with an electric power steering apparatus having high durability, good assembling workability, and high maintenance performance.

The above and other objects can be achieved according to the present invention by providing a straddle type vehicle with an electric power steering apparatus comprising:

a body frame of a vehicle;

a bar handle provided in a front portion of the vehicle body frame;

a steering shaft transmitting a turning operation of the bar handle to a pair of right and left front wheels; and an electric power steering apparatus mounted in an intermediate portion of the steering shaft for assisting a steering motion of the bar handle, the electric power steering apparatus including, in a state of the vehicle capable of being traveled:

an electric power steering main body including an electric motor, a gear unit, an input shaft and an output shaft;

an upper steering shaft in which the bar handle is attached to an upper end portion and an upper end of the input shaft is connected to a lower end portion; and a support member supporting the upper steering shaft.

In a preferred embodiment of the above aspect, it may be desired that the electric power steering apparatus further includes a tubular upper steering shaft support member integrally formed in an upper portion of a case body accommodating the gear unit of the electric power steering main body.

The case body accommodating the gear unit of the electric power steering main body and the upper steering shaft support member may be integrally provided by means of bracket.

It may be desired that the electric power steering apparatus is supported to the vehicle body frame at two upper and lower positions by an upper attaching portion and a lower attaching portion, and a coupling portion between the upper steering shaft and the input shaft is provided between both the attaching portions. The upper attaching portion is formed in the support member of the upper steering shaft, and the lower attaching portion is formed in the case body accommodating the gear unit.

It may be also desired that a stopper regulating a turning range of the bar handle is integrally provided in the support member of the upper steering shaft.

It may be also desired that the electric power steering apparatus is attached to an upper side of the vehicle body frame, an upper end portion of a lower steering shaft is coupled to a lower end portion of the output shaft, and a lower end portion of the lower steering shaft is coupled to a steering link mechanism steering a pair of right and left front wheels right and left.

According to the straddle type vehicle with the electric power steering apparatus of the characters mentioned above, since each of the members of the electric power steering apparatus is formed as a unit, maintenance thereof can be performed easily and the assembling workability can be effectively improved.

Furthermore, the rigidity of the vehicle body can be improved, and the durability of the electric power steering apparatus can be also improved.

The nature and further characteristic features of the present invention will be made clearer from the following descriptions made with reference to the accompanying drawings.

BRIEF DESCRIPTION OF THE DRAWINGS

In the accompanying drawings

DESCRIPTION OF THE PREFERRED EMBODIMENT

A description will be given below of an example according to the present invention with reference to the accompanying drawings, in which terms of "upper", "lower", "right", "left" and the like terms are used herein with reference to the illustration of the drawings or in a standing state of a vehicle.

Figure 1:
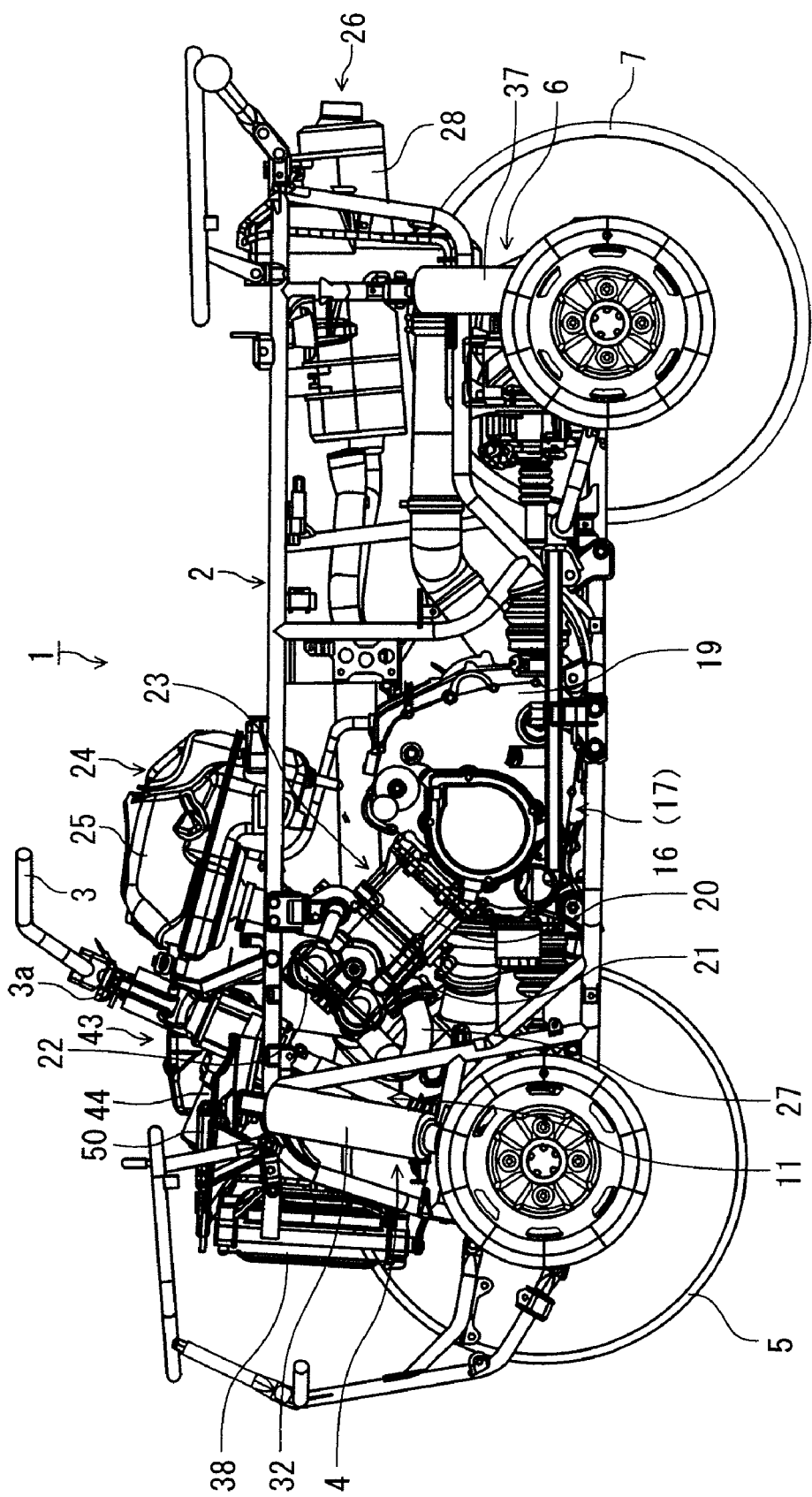
FIG. 1 is a left side view of an all terrain vehicle showing an embodiment of a straddle type vehicle with an electric power steering apparatus according to the present invention.
Figure 2:
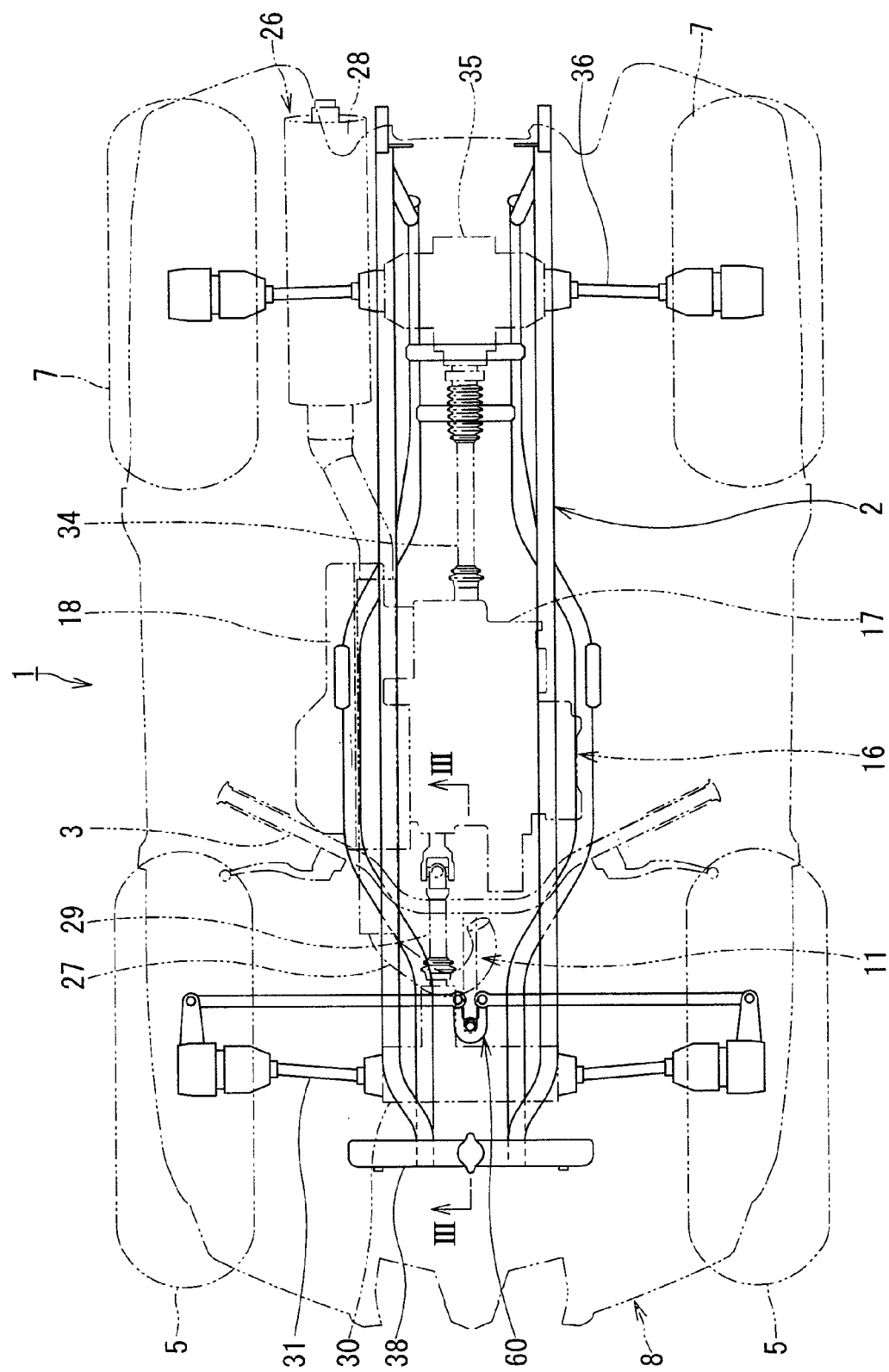
FIG. 2 is a schematic plan view of the all terrain vehicle shown in FIG. 1.

As shown in FIGS. 1 and 2, a straddle type all terrain vehicle 1 (hereinafter, may refer to merely as a vehicle) includes a vehicle body frame 2 constructed as an approximately cage shape, for example, by coupling a pair of right and left frame members made of a steel pipe in a width direction.

A bar handle 3 serving as a steering apparatus of the vehicle 1 is attached to a front upper portion of the vehicle body frame 2. Further, a pair of right and left front wheels 5 with wide low-pressure tires are mounted on a front portion of the vehicle body frame 2 via a front suspension mechanism 4, and a pair of right and left rear wheels 7 with wide low-pressure tires are mounted on a rear portion of the vehicle body frame 2 via a rear suspension mechanism 6, respectively.

Further, an upper surface and a side surface of the vehicle 1 are covered by a vehicle body cover 8.

Figure 3:
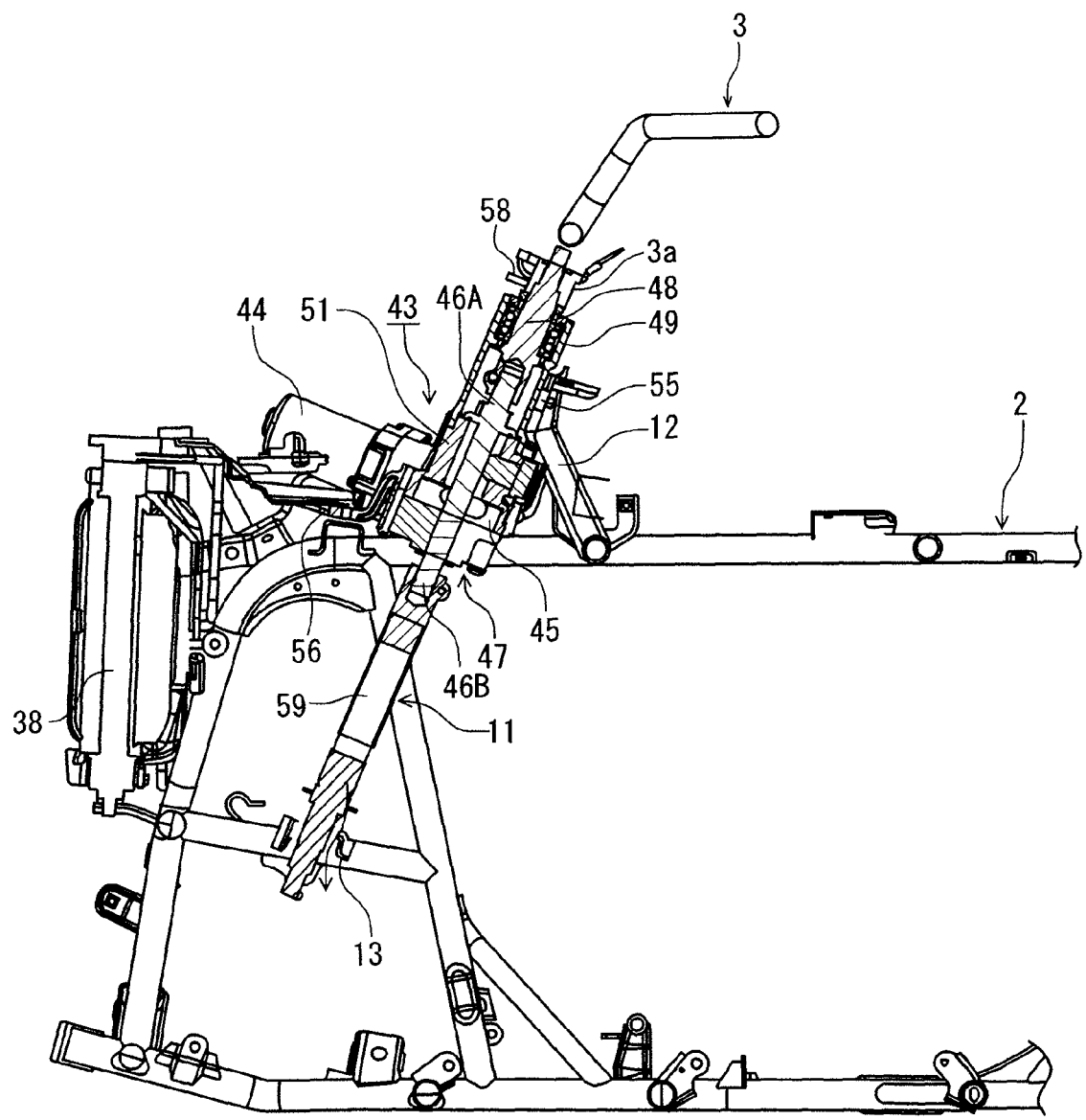
FIG. 3 is a cross sectional view taken along a line III-III of FIG. 2.

FIG. 3 is a cross sectional view taken along a line III-III of FIG. 2. As shown in FIG. 3, a steering shaft 11 extends from a base portion 3a of the bar handle 3 toward the front wheel 5 in a forward diagonally lower side. An upper portion of the steering shaft 11 is pivotally supported by an upper support portion 12, for example, provided in an upper portion of the vehicle body frame 2. Further, a lower portion of the steering shaft 11 is pivotally supported by a lower support portion 13, for example, provided in a lower portion of the vehicle body frame 2. As shown in FIG. 1, an engine unit 16 is mounted in a center lower portion of the vehicle body frame 2, that is, between the front and rear wheels 5 and 7, and in rear of the steering shaft 11.

The engine unit 16 includes, for example, an engine main body 17 and a belt type continuously variable transmission 18 arranged in one side of the engine main body 17, for example, in a right side thereof. The engine main body 17 is, for example, a water-cooled four-cycle single cylinder engine, and has a crank case 19, and a cylinder assembly 23 including a cylinder block 20 mounted on the crank case 19 and inclined forward at a comparatively large angle, a cylinder head 21 and a head cover 22.

An engine intake system 24 is arranged above the cylinder assembly 23 in a rear space of the steering shaft 11. The engine intake system 24 includes a throttle body, not shown, connected to a rear side of the cylinder head 21, and an air cleaner 25 connected to an upper side of the throttle body.

On the other hand, an engine exhaust system 26 is arranged in one side of the engine main body 17, in a right side in the present embodiment. The engine exhaust system 26 includes an exhaust pipe 27 connected to a front side lower surface of the cylinder head 21 and an exhaust muffler 28, the exhaust pipe 27 temporarily extends toward a front side of the cylinder head 21 and extends toward a diagonally rear upper side little by little while being curved so as to bypass the cylinder assembly 23. A downstream end of the exhaust pipe is connected to the exhaust muffler 28.

A propeller shaft 29 driving the front wheels extends toward a front side from a front portion of the crank case 19, and a front end of the propeller shaft 29 is coupled to a front final reduction gear unit 30. Further, a pair of right and left front drive shafts 31 extend toward the right and left front wheels 5 from the front final reduction gear unit 30 and are coupled to the right and left front wheels 5.

Further, a pair of right and left front cushion units 32 of the front suspension mechanism 4 are supported to the vehicle body frame 2, and the right and left front wheels 5 are elastically supported to the vehicle body frame 2 by the front cushion units 32.

On the other hand, a propeller shaft 34 driving the rear wheels extends toward a rear side from a rear portion of the crank case 19, and a rear end of the propeller shaft 34 is coupled to a rear final reduction gear unit 35.

Further, a pair of right and left rear drive shafts 36 extend toward the right and left rear wheels 7 from the rear final reduction gear unit 35 and are coupled to the right and left rear wheels 7. A pair of right and left rear cushion units 37 of the rear suspension mechanism 6 are supported to the vehicle body frame 2, and the right and left rear wheels 7 are elastically supported to the vehicle body frame 2 by the rear cushion units 37.

A heat exchanger of the engine main body 17, that is, a radiator 38 for cooling the engine main body 17 is installed in the vicinity of a frontmost portion of the vehicle body frame 2, in the front side of the steering shaft 11.

An electric power steering apparatus 43 for assisting a steering motion of the bar handle 3 is mounted in an intermediate portion of the steering shaft 11 transmitting the steering motion of the bar handle 3 to the front wheel 5.

Figure 4:
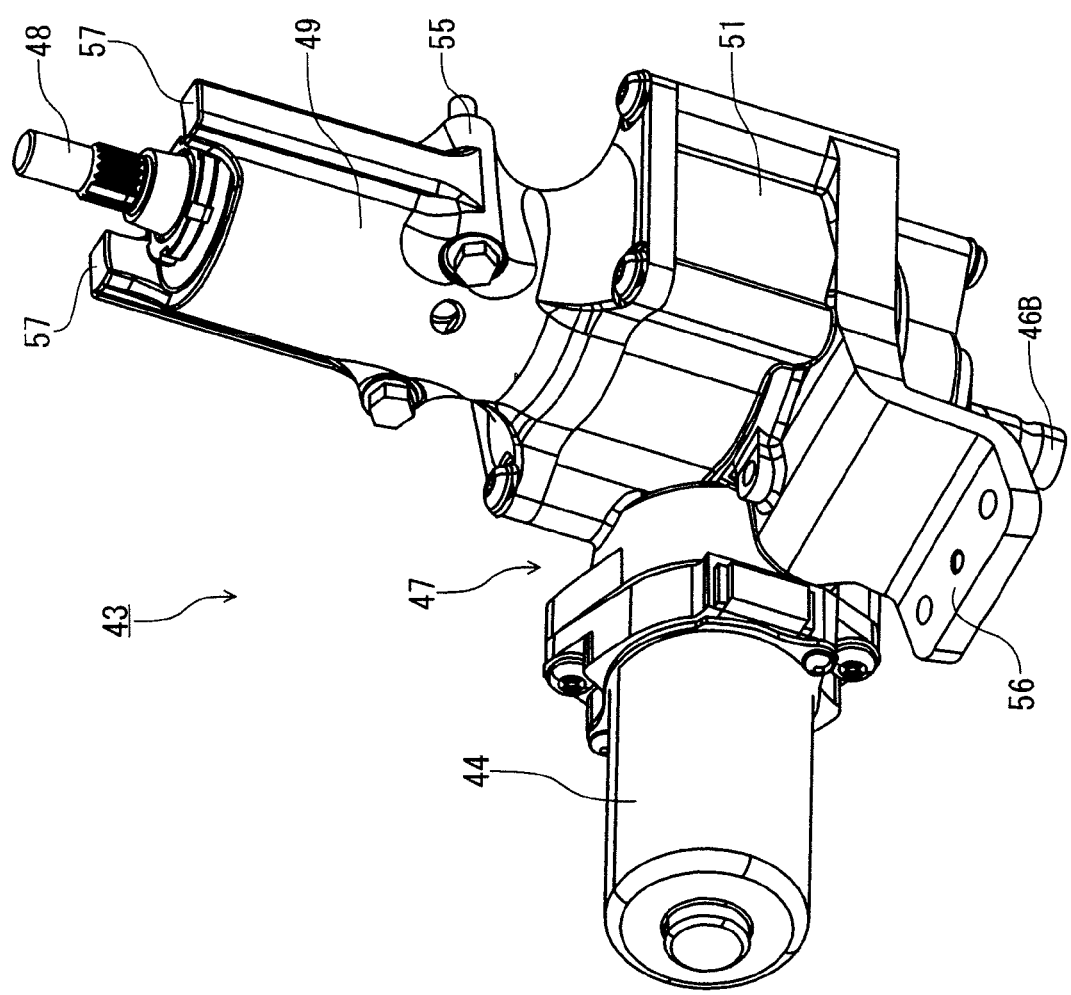
FIG. 4 is a perspective view of a first example of the electric power steering apparatus.
Figure 5:
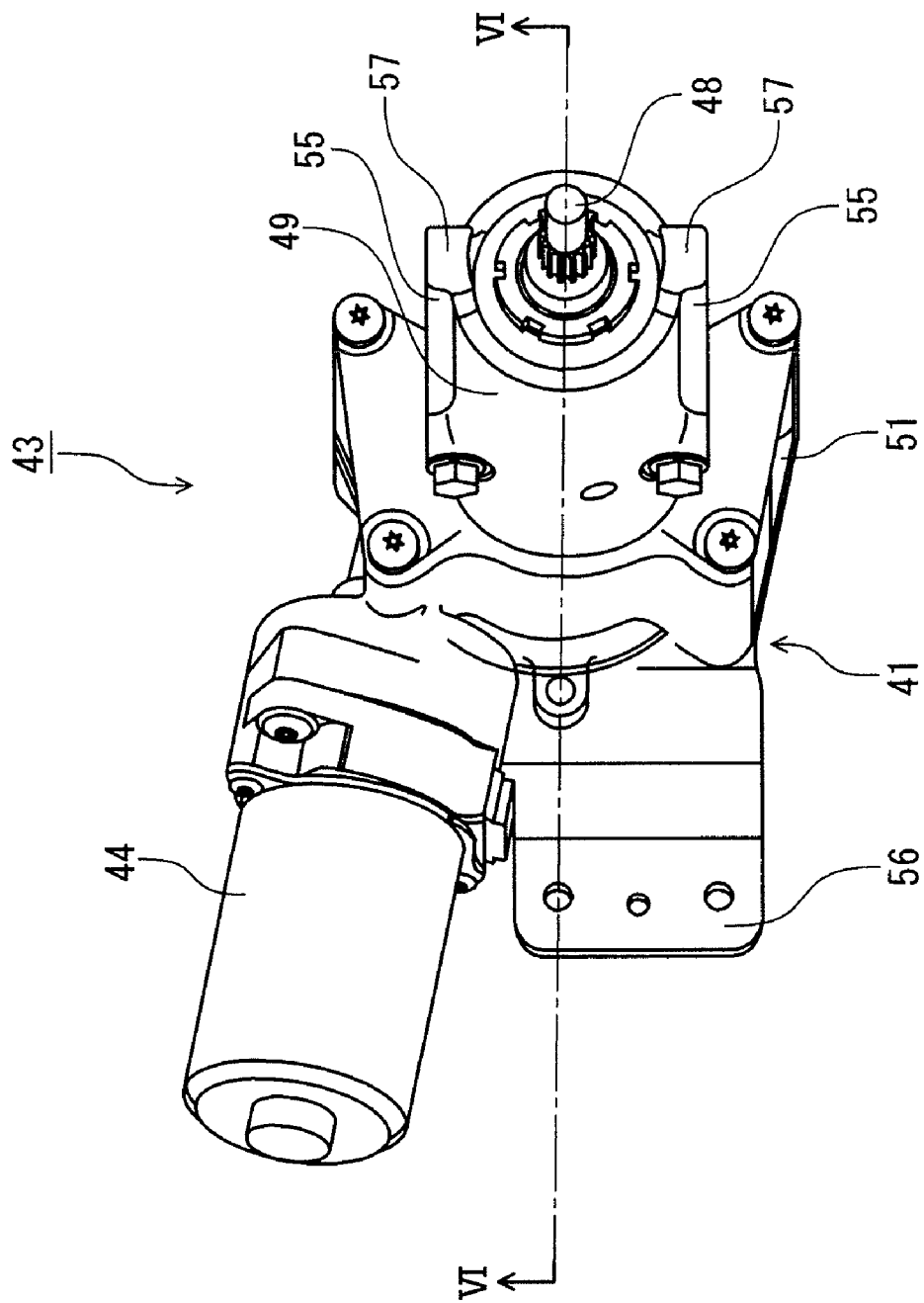
FIG. 5 is a plan view of the electric power steering apparatus.
Figure 6:
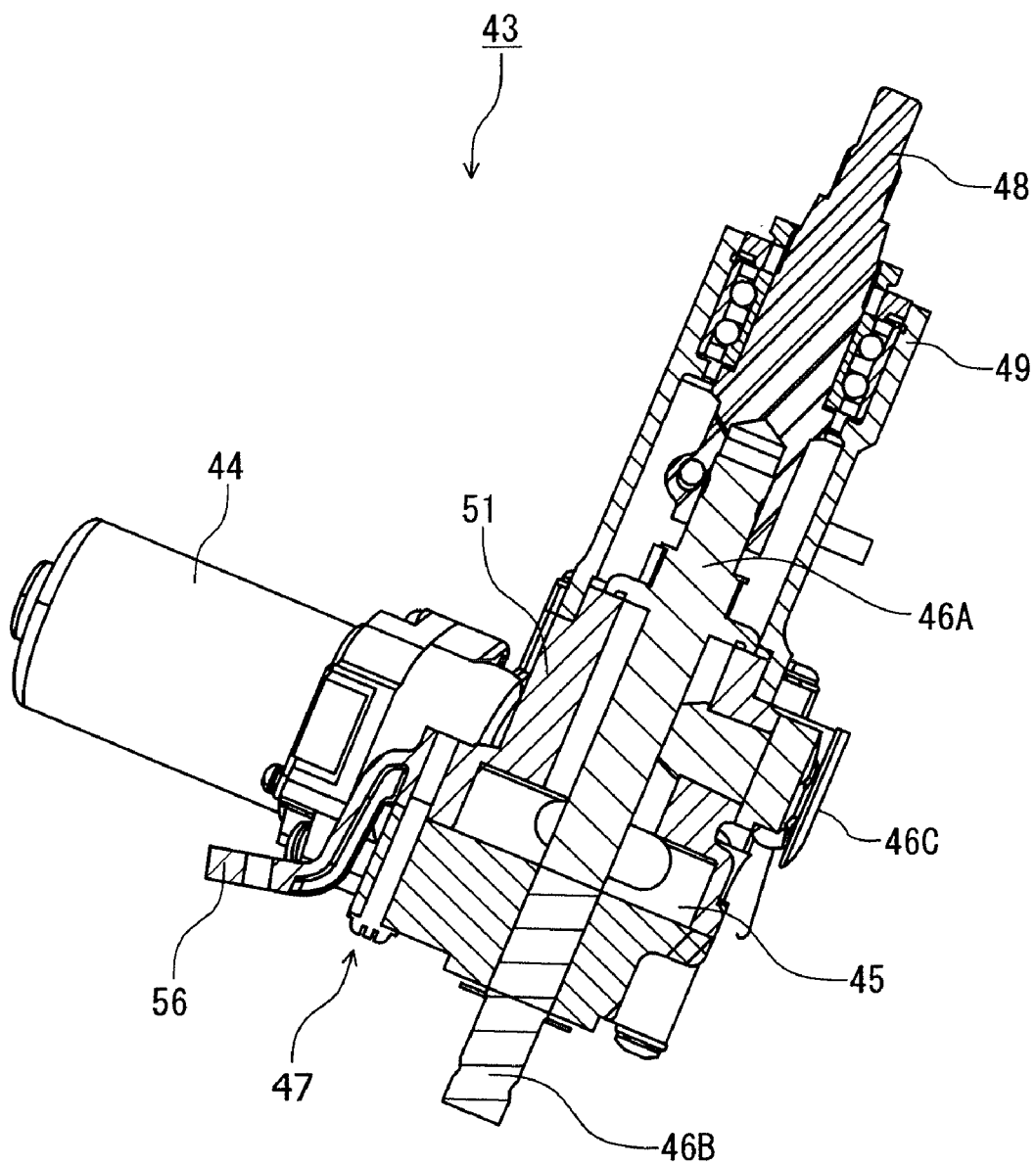
FIG. 6 is a cross sectional view taken along a line VI-VI of FIG. 5.

FIG. 4 is a perspective view of the electric power steering apparatus 43, and FIG. 5 is a plan view of the same. Further, FIG. 6 is a cross sectional view taken along a line VI-VI of FIG. 5.

As shown in FIGS. 3 to 6, The electric power steering apparatus 43 includes an electric power steering main body 47 including an electric motor 44, a gear unit 45, an input shaft 46A, an output shaft 46B, an upper steering shaft 48, a support member 49 of the upper steering shaft 48, and a controller 50 (refer to FIG. 1) controlling the electric power steering apparatus 43.

The bar handle 3 is attached to an upper end portion of the upper steering shaft 48, and an upper end of the input shaft 46A is connected to a lower end portion of the upper steering shaft 48. Further, the support member 49 of the upper steering shaft 48 is formed as a tubular shape and is integrally provided in an upper portion of a case body 51 accommodating the gear unit 45 of the electric power steering main body 47.

An upper attaching portion 55 is formed in the support member 49 of the upper steering shaft 48, and the upper steering shaft 48 is attached to the vehicle body frame 2 via the upper support portion 12 provided in the upper portion of the vehicle body frame 2. A lower attaching portion 56 is formed in the case body 51 accommodating the gear unit 45, and the upper steering shaft 48 is attached to the vehicle body frame 2 via the lower attaching portion 56.

A coupling portion between the upper steering shaft 48 and the input shaft 46A, and a coupling portion between the input shaft 46A and the output shaft 46B are arranged between the upper attaching portion 55 and the lower attaching portion 56. In this case, the input shaft 46A and the output shaft 46B are connected via a torsion bar, not shown, and torsion of the torsion bar is detected by a torque sensor 46C.

A pair of right and left stoppers 57 are integrally provided in an upper portion of the support member 49 of the upper steering shaft 48, and a projection 58 (refer to FIG. 2) formed in the base portion 3a of the bar handle 3 comes into contact with the stopper 57, thereby regulating a turning range of the bar handle 3.

Further, an upper end portion of the lower steering shaft 59 is coupled to a lower end portion of the output shaft 46B, and a lower end portion of the lower steering shaft 59 is coupled to a steering link mechanism 60 as shown in FIG. 2, and the front wheels 5 can be steered right and left by turning the bar handle 3 right and left.

Figure 7:
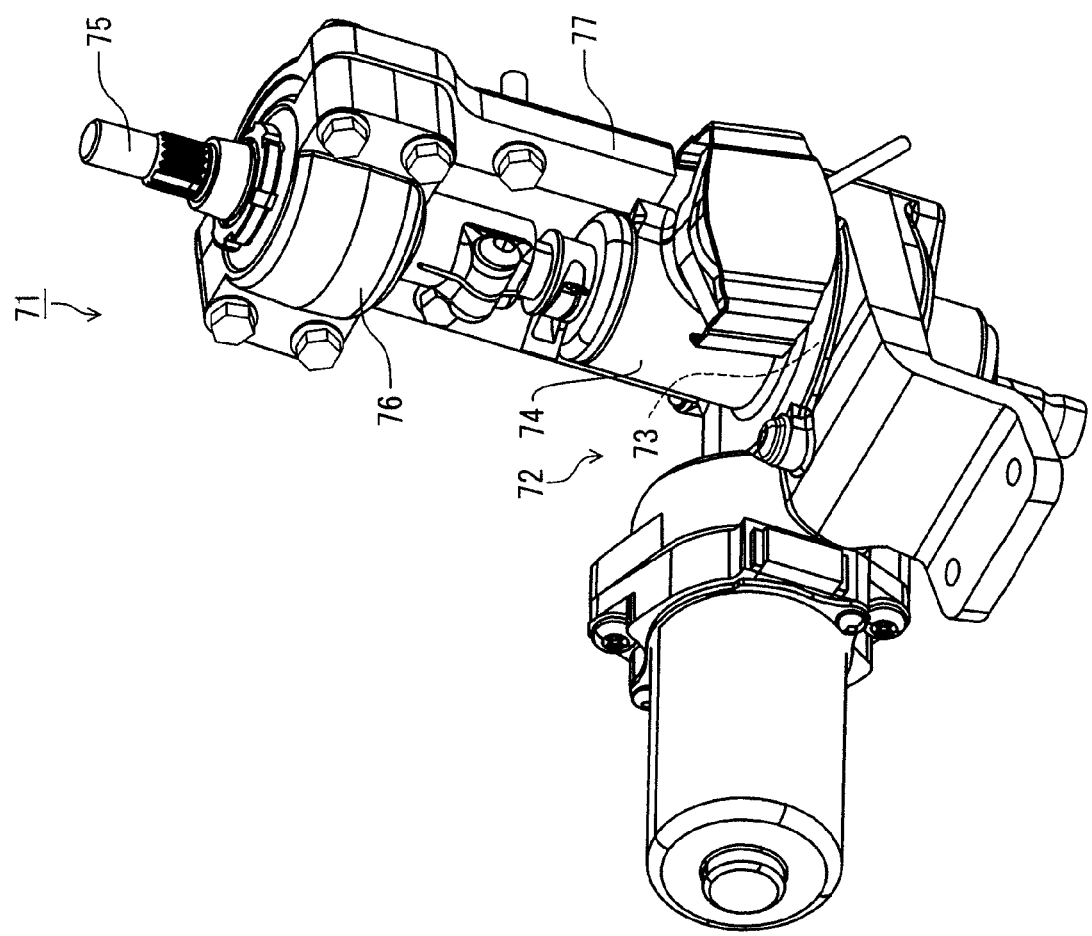
FIG. 7 is a perspective view of a second example of the electric power steering apparatus.

FIG. 7 is a perspective view of an electric power steering apparatus 71, and as shown in FIG. 7, the electric power steering apparatus 71 includes a case body 74 accommodating a gear unit 73 of an electric power steering main body 72 and a support member 76 of an upper steering shaft 75. The case body 74 and the support member 76 are integrated through a bracket 77.

The power steering apparatus of the present embodiment will operate as follows.

The electric power steering apparatus 43 includes the electric power steering main body 47 including the electric motor 44, the gear unit 45, the input shaft 46A, the output shaft 46B, the upper steering shaft 48 in which the bar handle 3 is attached to the upper end portion and the upper end of the input shaft 46A is connected to the lower end portion, and the support member 49 supporting the upper steering shaft 48. Each of these members is formed as a unit. Accordingly, maintenance performance and the assembling workability can be improved, and for example, it is possible to detach the electric power steering apparatus 43 without detaching the bar handle 3 attached to the upper end of the upper steering shaft 48.

Further, since the support member 49 of the upper steering shaft 48 is formed as the tubular shape and integrally in the upper portion of the case body 51 accommodating the gear unit 45 of the electric power steering main body 47, the coupling portion between the upper steering shaft 48 and the input shaft 46A is not exposed to the outside. Therefore, the coupling portion can be protected from the external force, the water and the like, and the durability thereof can be improved.

On the other hand, in the case that the case body 74 accommodating the gear unit 73 of the electric power steering main body 72 and the support member 76 of the upper steering shaft 75 are integrated through the bracket 77 as shown in this embodiment of FIG. 7, it is possible to divert the existing electric power steering main body used in a four-wheel vehicle or the like.

Further, the electric power steering apparatus 43 is supported at two upper and lower positions by the upper attaching portion 55 and the lower attaching portion 56, and the coupling portion between the upper steering shaft 48 and the input shaft 46A and the coupling portion between the input shaft 46A and the output shaft 46B are provided between both the attaching portions 55 and 56. Therefore, the external force such as the bending force or the like from the bar handle 3 can be prevented from being applied to the coupling portion, and the durability can be improved.

Furthermore, since the electric power steering apparatus 43 is supported to the vehicle body frame 2 at two upper and lower positions, the rigidities of the electric power steering apparatus 43 and the vehicle body are enhanced.

In addition, since the upper attaching portion 55 is formed in the support member 49 of the upper steering shaft 48 and the lower attaching portion 56 is formed in the case body 51 accommodating the gear unit 45, it is not necessary to separately prepare the bracket or the like for attaching the electric power steering apparatus 43. Accordingly, the number of the parts can be reduced, the assembling workability can be improved, and the compact electric power steering apparatus 43 can be provided.

Furthermore, since the stopper 57 regulating the turning range of the bar handle 3 is integrally provided in the support member 49 of the upper steering shaft 48, it is not necessary to provide the stopper support portion, and accordingly, the number of the parts can be reduced, and the assembling workability is improved. An excessive turning force is not transmitted to the electric power steering apparatus 43, and therefore, the electric power steering apparatus 43 can be protected, and the durability can be improved.

The electric power steering apparatus 43 is attached to the upper side of the vehicle body frame 2, the upper end portion of the lower steering shaft 59 is coupled to the lower end portion of the output shaft 46B, and the lower end portion of the lower steering shaft 59 is coupled to the steering link mechanism 60 steering a pair of right and left front wheels 5 right and left. Thus, the upper side of the electric power steering apparatus 43 including the bar handle 3 can be integrally attached and detached, and the maintenance performance and the assembling workability can be improved.

Moreover, the power steering apparatus is hard to be affected by the mud, the water or the like, by being attached to the upper side of the vehicle body frame 2, and the durability of the power steering apparatus is improved.

It is to be further noted that the present invention is not limited to the described embodiments and many other changes and modifications may be made without departing from the scopes of the appended claims.

What is claimed is:

1. A straddle type vehicle with an electric power steering apparatus comprising:
a body frame of a vehicle;
a bar handle provided in a front portion of the vehicle body frame;
a steering shaft transmitting a turning operation of the bar handle to a pair of right and left front wheels; and
an electric power steering apparatus mounted in an intermediate portion of the steering shaft for assisting a steering motion of the bar handle, the electric power steering apparatus including, in a state of the vehicle to be traveled:
an electric power steering main body including an electric motor, a gear unit, an input shaft, an output shaft;
an upper steering shaft in which the bar handle is attached to an upper end portion and an upper end of the input shaft is connected to a lower end portion; and
a support member supporting the upper steering shaft,
wherein the support member is provided so as to extend to the upper end portion of the upper steering shaft to which a base portion of the bar handle is attached, and upper and lower attaching portions are formed to the support member of the upper steering shaft and to a case body accommodating the gear unit, respectively for the vehicle body frame, the upper steering shaft support member is a tubular upper steering shaft support member integrally formed in an upper portion of the case body accommodating the gear unit, the support member of the upper steering shaft is provided integrally with a stopper that regulates a turning range of the bar handle, and the turning range of the bar handle is controlled by abutment of a projection formed to the base portion of the bar handle against the stopper, and the stopper regulating the turning range projects laterally from a tubular portion of the upper steering shaft support member so as to vertically extend to an upper-side mount portion of the body frame.

2. The straddle type vehicle according to claim 1, wherein the case body accommodating the gear unit and the upper steering shaft support member are integrally provided through a bracket.

3. The straddle type vehicle according to claim 1, wherein the electric power steering apparatus is supported to the vehicle body frame at two upper and lower positions by the upper and lower attaching portions, and a coupling portion between the upper steering shaft and the input shaft is provided between both the upper and lower attaching portions.

4. The straddle type vehicle according to claim 1, wherein the electric power steering apparatus is attached to an upper side of the vehicle body frame, an upper end portion of a lower steering shaft is coupled to a lower end portion of the output shaft, and a lower end portion of the lower steering shaft is coupled to a steering link mechanism steering the pair of right and left front wheels right and left.

* * * * *